July 8, 1958      B. C. HARBERT      2,841,979
COMBUSTION STUDY DEVICE
Filed May 16, 1955      3 Sheets-Sheet 1

INVENTOR.
B. C. HARBERT
BY
ATTORNEYS

July 8, 1958

B. C. HARBERT 2,841,979

COMBUSTION STUDY DEVICE

Filed May 16, 1955

INVENTOR.
B.C. HARBERT
BY
Hudson and Young

ATTORNEYS

United States Patent Office 2,841,979
Patented July 8, 1958

2,841,979
COMBUSTION STUDY DEVICE

Bobby C. Harbert, Bartlesville, Okla., assignor to Phillips Petroleum Company, a corporation of Delaware Application May 16, 1955, Serial No. 508,525

7 Claims. (Cl. 73—35)

This invention relates to the study of combustion phenomena within an internal combustion engine. In one of its aspects, it relates to means for observing combustion phenomena occurring within spark-ignited internal combustion engines and for recording such observations. In another of its aspects, it relates to a method of observing preignition, knock and other combustion phenomena taking place within the combustion chamber of a spark-ignited internal combustion engine.

Although considerable information has been developed and recorded on the effects of the hydrocarbon structure of engine fuels, fuel additives and engine operating conditions in general, the basic chemical and physical processes which result in knock, preignition and other phenomena in the operation of Otto cycle engines have not been definitely established. The problem of studying the mechanics of combustion in a high speed internal combustion engine is greatly complicated by the fact that the entire combustion process must be completed during a period of time which is less than 0.01 second. Various methods have been proposed for studying the reaction mechanisms leading to such phenomena as preignition and knock in internal combustion engines, the obvious method involving experiments with an operating engine under knocking or preignition conditions. Pickup devices which have been previously utilized in combustion studies have recorded changes in pressure, temperature, electrical conductivity, etc. All of the methods using such devices require a considerable length of time as compared to the speed of light for changes in the combustion chamber to reach the pickup point. Many such methods have proven to be inadequate, particularly with respect to knock and preignition studies, because of their failure to give an instantaneous indication of combustion chamber conditions. Furthermore, many of the pickup devices described in the literature, in general, do not possess the desired sensitivity to changes in combustion chamber conditions being subject to the disadvantage of inertia. Thus, such devices often fail to distinguish small energy changes occurring in the combustion chamber of the engine, such changes being masked by the large energy change taking place upon detonation of the fuel. In accordance with this invention, a novel apparatus is provided for studying the physical and chemical processes occurring in spark-ignited internal combustion engines whereby the light liberated is utilized to record changes occurring within the combustion chamber substantially instantaneously with the occurrence of such changes.

The following are objects of the invention.

It is an object of this invention to provide means for studying the combustion phenomena occurring within an internal combustion engine.

Another object of the invention is to provide a method and apparatus for observing preignition, knock and other combustion phenomena taking place within the combustion chamber of a spark-ignited internal combustion engine.

A further object of the invention is to provide a combustion study device which also functions as an ordinary spark plug and can be inserted in a spark plug aperture and which further provides means for transmitting light liberated from the combustion chamber of the engine to a light sensitive measuring means.

A still further object of the invention is to provide a means for observing preignition, knock and other combustion phenomena taking place within the combustion chamber of a spark-ignited internal combustion engine without disturbing the environment in which such phenomena normally occur.

Other and further objects and advantages of the invention will become apparent to one skilled in the art upon consideration of the following disclosure.

Broadly speaking, the present invention resides in a method and means for observing the combustion phenomena occurring within the combustion chamber of an internal combustion engine. In a broad aspect, the combustion study device of this invention comprises a spark plug having a hollow central electrode in which there is disposed a rod formed of a transparent material such as quartz or sapphire.

In a more specific aspect, the apparatus of this invention comprises a combustion study device, as described above, in combination with a light sensitive measuring or indicating means, such as a photoelectric cell, spectrograph, or camera, which serves to convert the changes in light liberated in the combustion chamber into observations indicative of the combustion process. It is preferred to utilize a photoelectric cell in conjunction with the combustion study device since it possesses a high degree of sensitivity with a time lag of zero and is entirely free from inertia effects. The response of the photoelectric cell is directly proportional to the light received and furthermore is stable in its operation and free from all hunting action. Because of its high sensitivity to infrared radiation, the photoelectric cell is especially useful in "invisible light" applications. It is also a most efficient means for detecting a low temperature light source. While the human eye can detect wave lengths ranging from 0.4 to 0.7 micron, the photoelectric cell is sensitive to wave lengths, for example, from 0.3 to 1.2 microns. In other words, the photoelectric cell is sensitive to both ultraviolet and infrared radiations which are not visible to the human eye. The spectrograph, as previously mentioned, can also be used in conjunction with the combustion study indicator of this invention, and the results obtained by the use of this instrument are of importance in combustion studies. Thus, the emission spectra obtained yield information about the intermediate reaction products which are formed in the flame, and such information assists materially in the final determination of the course of the combustion reactions.

A more comprehensive understanding of the invention may be obtained by referring to the following description and the drawing in which:

Figure 4 is a cross-sectional view taken along line 4—4 of Figure 1;

Figure 5 is a cross-sectional view taken along line 5—5 of Figure 1;

Figure 1:
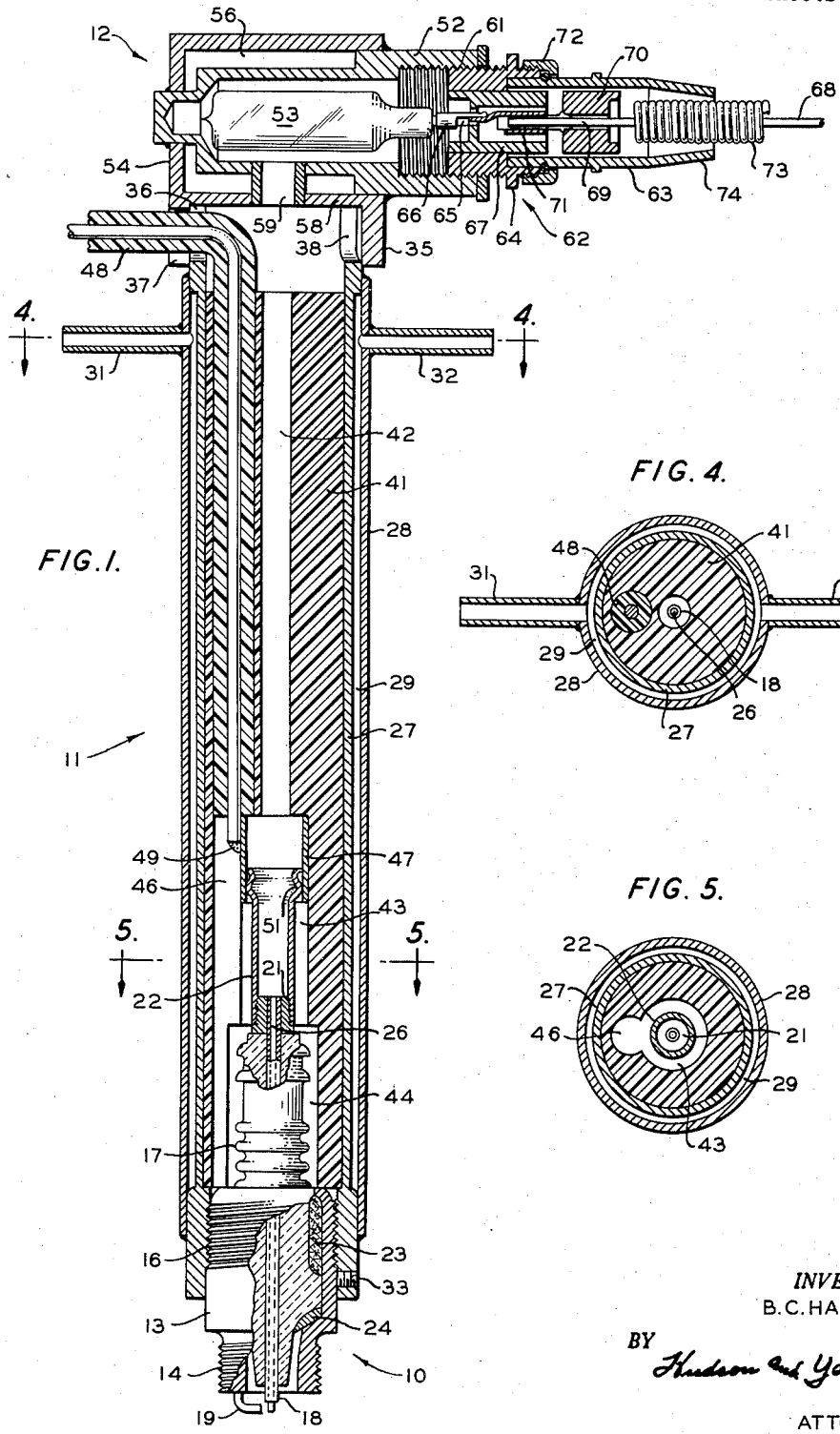
Figure 1 is an elevational view, partly in section, of the combustion study device of this invention and its associated light sensitive measuring means.

Referring now to the drawing and in particular to Figure 1, the apparatus of this invention as illustrated therein comprises three principal elements, namely, combustion study device 10, heat exchanger or combustion study device extension 11, and photoelectric cell holder 12. The combustion study device, which may be adapted from a conventional spark plug, comprises an outer metallic body member 13. Body member 13 at one end is provided with a threaded portion 14 which fits into the spark plug aperture of an internal combustion engine. The other end of body element 13 is also provided with threads 16 which furnish means for attaching heat exchanger 11 to the combustion study device. Disposed within and extending above the body member, there is a ceramic insulator 17 having a central opening therethrough in which central electrode 18 is positioned. Central electrode 18 extends through ceramic insulator 17 to a point adjacent side electrode 19 which is attached to body member 13. The central electrode is maintained in position by hollow electrode nut 21 which has one of its ends threaded into ceramic insulator 17. An electrode cap 22, which is threaded onto the other end of electrode nut 21, acts as an extension of the central electrode. Between the upper portion of the body member and the ceramic insulator, there is disposed a packing material 23, such as asbestos, while a sealing ring 24 formed of a metal, such as copper, is positioned between the lower portions of the ceramic insulator and the body member. The packing material and the sealing ring function to prevent the escape of combustion gases through the combustion study device. Similar packing material is provided between electrode 18 and insulator 17.

Central electrode 18, which is disposed within the ceramic insulator, is a hollow rod having a small diameter hole extending throughout its length. Within this small opening in the central electrode, there is located a solid rod 26 formed of a transparent material, such as sapphire or quartz. It is preferred that the transparent rod extend throughout the entire length of the electrode, but other modifications can be resorted to which come within the scope of the invention. For example, in one modification of the invention, the transparent rod is of such a length that it fills only about the lower half of the hollow central electrode while in another modification it fills only about the upper half of the electrode. This latter modification has, however, proven to be inferior to the other due to the fact that light is absorbed on the relatively dirty walls of the electrode opening below the transparent rod. By positioning the rod so that its lower end is about even with the lower end of the electrode, this disadvantage is eliminated. The transparent rod is held in place by a suitable bonding material, such as porcelain cement.

Figure 2:
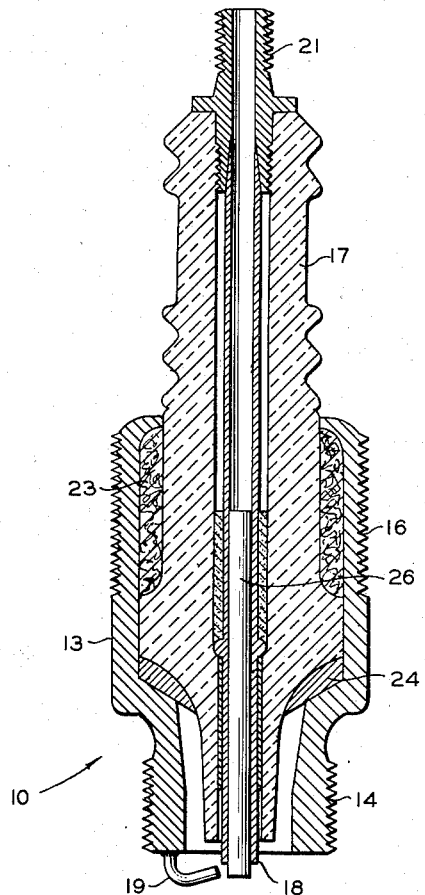
Figure 2 is an elevation, partly in section, illustrating one modification of the combustion study device of this invention.
Figure 3:
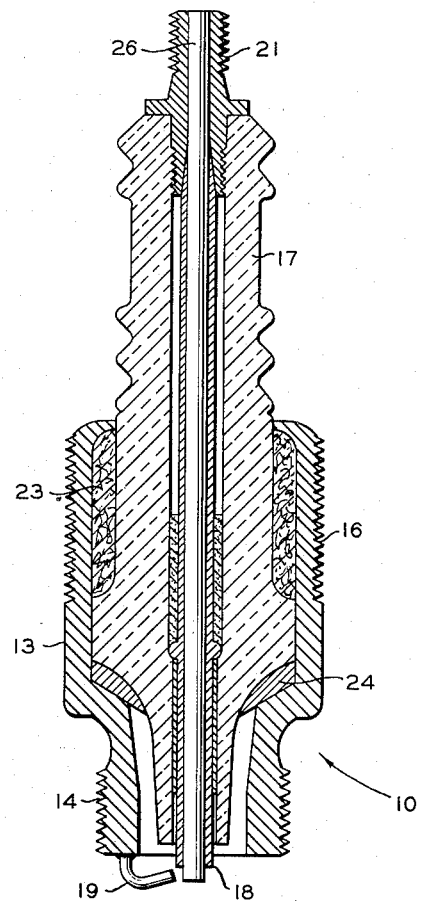
Figure 3 is an elevation, partly in section, illustrating another modification of the combustion study device of this invention.

By referring to Figures 2 and 3, a clearer understanding of the structure of the combustion study device can be obtained. Identical reference numerals have been used to designate elements described above with relation to Figure 1. With regard to Figure 2, it is noted that transparent rod 26 occupies only about the lower half of hollow electrode 18. In Figure 3 on the other hand, the transparent rod is shown as extending throughout the length of the electrode and electrode nut 21.

Referring once again to Figure 1, heat exchanger 11 comprises a substantially cylindrical inner member 27 surrounded by an outer jacket member 28 so as to provide an annular space 29 therebetween. Conduits 31 and 32, attached to jacket member 28, furnish means for circulating a heat exchange fluid, such as water, through annular space 29. A hollow tube, not shown, is preferably attached to conduit 31 and extends downwardly into annular space 29, in order to provide for a more efficient circulation of heat exchange liquid through the annular space. The lower end of cylindrical member 27 is provided with interior threads which cooperate with the threaded upper portion of body member 13. Thus, heat exchanger 11 is supported by the combustion chamber device. A set screw 33 is threaded through the lower end of cylindrical member 27 and contacts body member 13 so as to lock the heat exchanger securely in position. The upper end of cylindrical member 27 extends above the jacket member a substantial distance so as to provide a seat for cell holder 12 having a lower projecting lip 35 which fits over the cylindrical member. A substantially semicircular opening 36, which is cut in the upper end of cylindrical member 27, cooperates with a similar opening 37 in lower projecting lip 35 of the holder, thereby providing a substantially circular opening for the electrical lead to the combustion study device. A second opening 38, similar to opening 37, is also formed in the upper end of cylindrical member 27 diametrically opposite opening 37. Provision of the second opening makes it possible to dispose the cell holder in a position 180° from that shown in the drawing.

A substantially cylindrical insulator 41, which is formed of a suitable insulating material, such as Lucite, is disposed within cylindrical member 27. The insulator rests within the cylindrical member upon the upper end of body member 13 of the combustion study device and extends up to about the upper end of cylindrical member 27. A central opening is provided throughout the length of insulator 41, the upper portion 42 of the opening being of a smaller cross section than the lower portions 43 and 44 which have progressively larger cross sections. Insulator 41 also has a second opening 46 therethrough offset somewhat from the central opening. The second opening extends throughout the length of the insulator, but in the lower part thereof it coincides with the enlarged portions 43 and 44 of the central opening so that a groove only is formed in the inner walls of the insulator. By extending the offset opening in this manner, assembly of the insulator, bushing 47 and electrical lead 48 is greatly facilitated. Electrical lead 48, which is covered with suitable insulation, preferably a plastic material, is positioned within offset opening 46. The inner end of the electrical lead is soldered, as indicated by reference numeral 49, to bushing 47 which fits into enlarged portion 43 of the central opening of the insulator. Electrode cap 22, which is attached by means of electrode nut 21 to the upper end of the central electrode of the combustion study device, has an expanded upper portion 51. When the combustion study device and its associated elements are assembled, as illustrated in Figure 1, the expanded portion 51 of electrode cap 22 contacts bushing 47 so as to provide a connection between central electrode 18 and electrical lead 48 which is in turn connected to the distributor of an internal combustion engine.

In order to assemble the above described elements, the combustion study device with electrode cap 22 in place is screwed into the bottom of the heat exchanger and locked in position by set screw 33. Electrical lead 48 with bushing 47 soldered thereto is inserted into the offset opening of insulator 41 from the lower end of the insulator. By exerting a slight pull on the electrical lead, the bushing is readily seated in enlarged portion 43 of the insulator. Insulator 41 may now be inserted into the upper end of heat exchanger 11, photoelectric cell holder cell 12 being detached therefrom. A slight pressure on the insulator will ensure that bushing 47 and electrode cap 22 are in contact.

By referring to Figures 4 and 5, which are sectional views taken along lines 4—4 and 5—5, respectively, of Figure 1, a better understanding may be obtained of the structure and arrangement of the apparatus described hereinabove. Identical reference numerals have been used to identify the elements which have been discussed with relation to Figure 1.

Photoelectric cell holder 12 is attached to the upper end of heat exchanger 11 which serves as a support for the holder. The cell holder comprises a cell chamber 52 in which photoelectric cell 53 is disposed. A substantially cylindrical jacket member 54 surrounds cell chamber 52 so as to form an annular space 56. Cylindrical jacket member 54 is provided with a projecting lip 35 which extends a substantial distance below lower closure member 58 of the jacket and has a diameter such that it fits closely over cylindrical member 27. As previously described, the lower edge of lip 35 is provided with an opening 37 which cooperates with one of the openings 36 or 38 in the upper end of cylindrical member 27. Set screws, not shown, pass through projecting lip 35 and seat against cylindrical member 27, thereby fastening cell holder 12 securely in position upon heat exchanger 11. Tubular member 59, which extends between openings in closure member 58 and the wall of cell chamber 52, is disposed directly above the central opening in insulator 41 so as to provide a continuous path from the central electrode of the combustion study device to photoelectric cell 53. A pair of conduits, not shown, are connected to cylindrical jacket member 54 so as to furnish means for circulating a heat exchange fluid through annular space 56. By continuously circulating a liquid, such as water, through annular space 29 and through annular space 56, heat from the engine which might damage the photoelectric cell and render it inaccurate is dissipated before it can reach the cell.

The open end of cell chamber 52 is provided with interior threads 61 to furnish means for securing plug 62 to the cell holder. Plug 62, as illustrated, is an Amphenol plug manufactured by the American Phenolic Corporation, of Chicago, Illinois, and comprises two principal parts, namely, male contact plug 63 and female contact plug 64. Photoelectric cell 53 has two prongs 65 which fit into jacks 66 supported within insulator 67 of female contact plug 64. Electrical leads 68 are soldered within contact members 69 which are supported within insulator 70 of male contact plug 63. Contact members 69 are in turn positioned within contact members 71 to which jacks 66 are soldered and which are also supported within insulator 67 of female contact plug 64. Interiorly threaded nut 72 provides means for locking male contact plug 63 and female contact plug 64 together in a fixed position. It is to be understood that only one of the prongs 66, jacks 67 and contact members 69 and 71 are shown in Figure 1. The electrical leads from plug 62 pass through spring 73 secured in the end of the plug by means of set screw 74. The spring serves merely to protect the electrical leads by preventing chafing of the leads against the end of the plug. In order to position the photoelectric cell in cell holder 12, it is merely necessary to insert prongs 66 into jacks 67 of the Amphenol plug. The plug can then be screwed into the open end of cell chamber 52, thereby properly positioning the cell within the cell holder. It is to be understood that it is not intended to limit the invention to the specific plug described, for any suitable commercially available plug adapted to support the photoelectric cell can be utilized.

Figure 6:
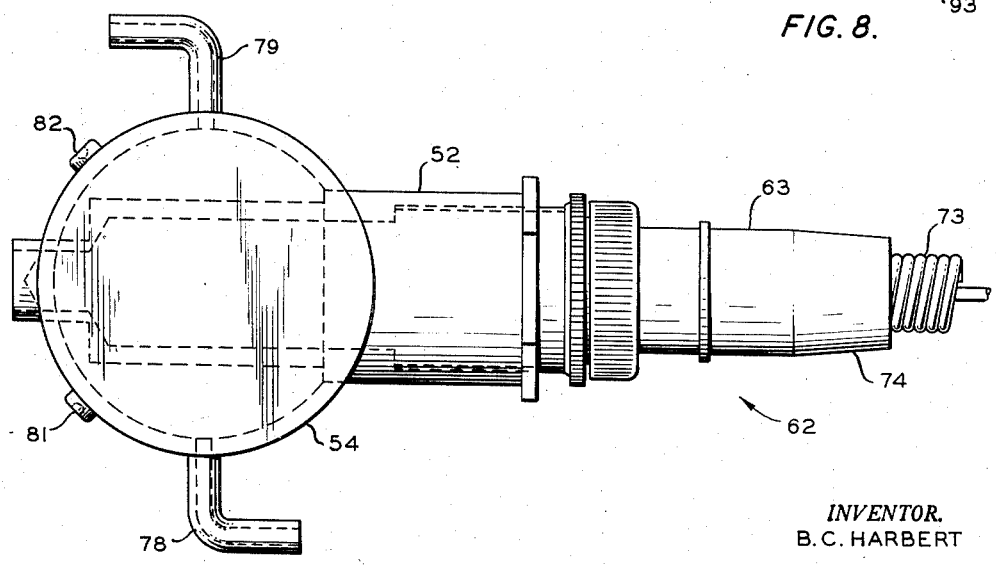
Figure 6 is a plan view of the apparatus illustrated in Figure 1.

Figure 6 of the drawing, which is a plan view of the apparatus of Figure 1, shows details of the apparatus which were mentioned in conjunction with Figure 1, but which were not illustrated. Elements which were described with relation to Figure 1 are indicated by identical reference numerals. Conduits 78 and 79 are attached to cylindrical jacket member 54 and provide means for passing a liquid into the annular space between that member and cell chamber 52. Set screws 81 and 82 extend through the projecting lip of jacket member 54 and seat against cylindrical member 27, thereby securely locking cell holder 12 in place upon the heat exchanger.

In the foregoing description, the apparatus of the invention has been described with a certain degree of particularity, but it is to be understood that various modifications of the invention can be practiced which come within the scope of the invention. Thus, while the embodiments of the combustion study device as described in detail are to be preferred, it is within the contemplation of the invention to form the device so that the entire insulator is a transparent material, such as quartz, rather than a ceramic material. In such a case, a solid central electrode is provided, and the light travels through the transparent insulator rather than through the transparent rod of the central electrode. In accordance with another modification of the invention, a solid electrode extends diagonally through the body of the combustion study device rather than centrally, and an opening is provided through the center of the device through which light can travel. The central opening is covered by an appropriate transparent window. It is also within the scope of the invention to position filters, which absorb known wave lengths of light, between the source of light and the photoelectric cell. For example, referring to Figure 1, such a filter can be positioned so as to cover the opening in tubular member 59, or the filter can be in the form of a rod of suitable composition disposed in the opening in the central electrode. It is thus possible to eliminate light having wave lengths not connected with the particular study being made. Still other modifications of the invention can be resorted to by one skilled in the art which will fall within the scope of the invention. Furthermore, it is not intended to limit the apparatus of this invention to its use with spark-ignited internal combustion engines, for it can also be employed to study the combustion phenomena occurring within compression ignition engines.

Figure 7:
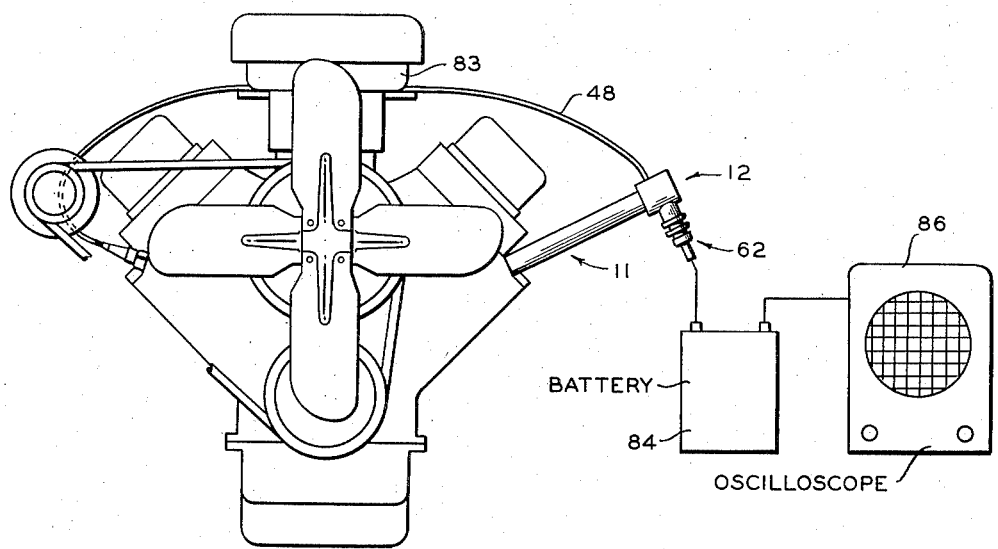
Figure 7 illustrates diagrammatically an arrangement of apparatus for studying the combustion phenomena of an internal combustion engine, utilizing the combustion study device of this invention.

Referring to Figure 7 of the drawing, there is illustrated a V8 spark-ignited internal combustion engine. The combustion chamber device of this invention, which supports heat exchange 11 and cell holder 12, is positioned in one of the spark plug apertures of the engine. The same reference numerals have been used to designate the principal elements of the invention as was used in Figure 1. Electrical lead 48, which is attached to the central electrode of the combustion study device leads to distributor 83 of the engine. The photoelectric cell contained in cell holder 12 is connected to a circuit containing a battery 84 and an oscilloscope 86.

Figure 8:
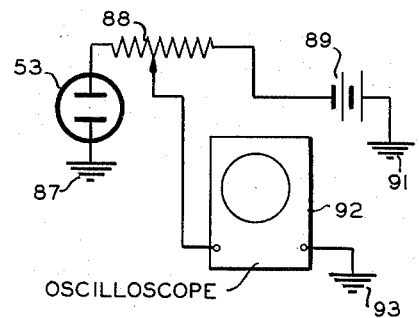
Figure 8 illustrates schematically the circuit with which the combustion study device of this invention is used.

Figure 8 of the drawing illustrates schematically the electrical circuit associated with photoelectric cell 53. Photoelectric cell 53, as illustrated, is a photoconductive cell such as a lead sulfide cell. A cell which can be advantageously used is a lead sulfide cell, type CE-A701, manufactured by the Continental Electric Company, of Geneva, Illinois. One terminal of cell 53 is grounded at 87 while the other terminal is connected to one end terminal of variable resistance 88. A source of direct current such as battery 89 has its positive terminal grounded at 91 while its negative terminal is connected to the other end terminal of variable resistor 88. The adjustable contact of variable resistance 88 is connected to one of the terminals of oscilloscope 92, the other terminal being grounded at 93. It has been found that the Model 304H oscilloscope of the Dumont Electric Corporation, of New York city, gives very satisfactory results. While the invention has been described with relation to a photoconductive cell, it is to be understood that a self-generating cell can be used in which case it becomes unnecessary to provide a source of power.

In the operation of the apparatus of this invention, as shown in Figure 7 of the drawing, light resulting from the combustion process occurring within the cylinder of the engine passes through the transparent rod contained in the central electrode of the combustion study device and travels through the central opening in the insulator, finally impinging upon the photoelectric cell within cell holder 12. Variations in light intensity within the cylinder of the engine cause the ohmic resistance of the cell to change, the amount of change being directly proportional to the variations in light intensity. Oscilloscope 92 measures the potential across the photoelectric cell and variable resistance 88 and records such measurements graphically on a screen as a function of time. Thus, the traces appearing upon the screen of the oscilloscope give an instantaneous and continuous indication of the changes occurring during the combustion process. Such traces may be photographed to permit a thorough study of the combustion phenomena taking place within the cylinder of the engine.

One of the principal advantages obtained in using the combustion study device of this invention is that only slight, if any, deposits of carbon or other material tend to form upon the transparent rod. Any reduction in the transmission of light to the photoelectric cell resulting from any such small deposits can be easily compensated for by increasing the amplification of the signal from the cell. In the prior art, quartz windows have been positioned in the blocks of internal combustion engines in order to observe combustion phenomena occurring therein, but such an arrangement has been found to be unsatisfactory because in a very short time carbon deposits collect on the windows, preventing observations from being made. Runs of over 100 hours in length have been conducted utilizing the instant invention with no problem of lack of light from the combustion reaction being encountered. It is believed that the lack of deposits on the transparent rod is due to the fact that the end of the rod is at the hottest point in the engine cylinder. The high heat insulation in the combustion study device above and about the transparent rod maintains this high heat which may remove any deposits from the end of the rod as they are formed. Furthermore, it is believed that the flame produced at the spark plug is much cleaner burning than the flame after it is propagated throughout the cylinder upon detonation.

Another important advantage of the instant invention resides in the fact that this invention makes possible the use of light and light sensitive instruments in the study of the combustion process. This advantage becomes even more apparent when compared with study methods based upon use of pressure changes in the combustion chamber. Light sensitive instruments are much more sensitive, and light of course travels much faster than changes in pressure can be transmitted. Furthermore, pressure sensitive instruments of any kind inherently have the disadvantage of inertia which is not present in a light sensitive instrument. For example, a relatively large energy change in the detonation of a fuel may be followed by a series of relatively small energy changes. The latter changes would be masked from the pressure sensitive device by its inertia after having responded to the primary energy change. On the other hand, by utilizing the instant invention it is possible to record both the large energy change and the secondary smaller energy changes. Another characteristic of pressure sensitive devices is that vibration causes the curves as observed on an oscillograph to be round and wavy whereas the curves from a light sensitive device such as is employed with the instant invention are completely smooth and easy to read. By the use of the combustion study device of this invention, it is possible to separate and investigate the various reactions taking place in the combustion chamber of an internal combustion engine.

A more comprehensive understanding of the invention may be obtained by referring to the following illustrative examples which are not intended, however, to be unduly limitative of this invention.

*Example I*

Figure 9:
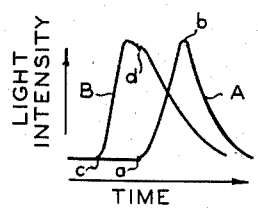
Figures 9 and 10 illustrate graphically traces occurring on an oscilloscope during certain combustion chamber studies.

In order to study the occurrence of preignition in an internal combustion engine, the combustion study device of this invention assembled as illustrated in Figure 1 was installed in the spark plug aperture of a CFR engine. The lead sulfide cell was connected in a circuit with a variable resistance, a 67½ volt battery and an oscilloscope in the manner shown in Figure 8. A pellet of pure graphite was suspended in the cylinder of the engine in order to artificially induce preignition. The compression ratio of the engine was increased until preignition was noted on the oscilloscope and a photograph of traces on the oscilloscope was taken in order to record this event. Figure 9 is a graphical reproduction of the photograph taken, the ordinate and abscissa of the graph being in terms of light intensity and time, respectively. Curve A indicates that the engine was operating in a satisfactory manner at the time that trace appeared on the oscilloscope with ignition occurring at point $a$ as a result of the spark produced by the combustion study device. The time at which sparking occurred is shown as a pip on the curve also designated by letter $a$. An examination of curve A indicates that the light intensity (or pressure) in the cylinder increased uniformly with time, reaching a maximum at point $b$ after which it decreased uniformly with time to its base value. A consideration of curve B shows that ignition occurred at point $c$ as indicated by the increase in light intensity (or pressure), but it is noted that there is no pip on the curve at this point, which would have indicated that sparking also occurred at this point. Further examination of curve B shows a pip at point $d$ indicating that the combustion study indicator sparked after the light intensity had reached a maximum and was decreasing. In other words, curve B indicates that preignition was occurring in the cylinder, i. e., the fuel was igniting before the spark was produced. An examination of the two curves shows also that point $d$ is directly above point $a$, showing that sparking occurred at the same time in the respective cycles.

*Example II*

Figure 10:
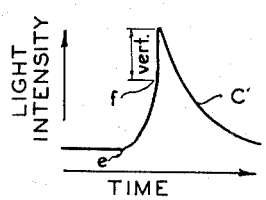

Utilizing the same installation as described in Example I, but with the graphite pellet removed, the engine was operated under knocking conditions. Figure 10 represents graphically by means of curve C one of the traces appearing on the oscilloscope. An examination of curve C shows that ignition occurred at point $e$ as a result of the spark produced by the combustion study device. Curve C also shows that at point $f$ the light intensity increased practically simultaneously to its maximum value, thereby indicating that a knocking explosion had occurred in the cylinder of the engine.

It will be apparent to those skilled in the art that various modifications of the invention can be made upon study of the accompanying disclosure. Such modifications are believed to be clearly within the spirit and scope of this invention.

I claim:

1. Apparatus for studying the combustion process of a spark-ignited internal combustion engine which comprises, in combination, a spark plug having a hollow central electrode; a transparent rod disposed within said central electrode; an elongated extension member having an interior passageway formed therein in axial alignment with said central electrode, said member being attached to and extending upwardly from said spark plug; an electrical conducting means connected to said central electrode; a photoelectrical cell container supported on the upper end of said extension member, said container having an opening formed in the walls thereof above said interior passageway of said extension member; and a photoelectric cell disposed within said cell container.

2. The apparatus of claim 1 in which said transparent rod extends throughout the length of said hollow central electrode.

3. The apparatus of claim 1 in which said transparent rod extends through a portion only of the length of said central electrode.

4. The apparatus of claim 1 in which said transparent rod is formed of sapphire.

5. The apparatus of claim 1 in which said transparent rod is formed of quartz.

6. Apparatus for studying the combustion process of a spark-ignited internal combustion engine which comprises, in combination, a spark plug having a hollow central electrode; a transparent rod disposed within said central electrode; a heat exchanger comprising an elongated cylindrical member encompassed by a first jacket member, said cylindrical member being attached to and extending upwardly from said spark plug; heat exchange fluid conduit means connected to said first jacket member; an electrical conducting means connected to said central electrode; a photoelectric cell holder comprising an inner cell chamber encompassed by a second jacket member, said jacket member being attached to the upper end of said cylindrical member; a tubular member extending through said cell chamber and said second jacket member, the longitudinal axis of said tubular member substantially coinciding with the longitudinal axis of said cylindrical member; and a photoelectric cell positioned within said cell chamber.

7. Apparatus for studying the combustion process of a spark-ignited internal combustion engine which comprises, in combination, an insulator provided with a central opening therethrough; a metallic body member surrounding the lower portion of said insulator and having a lower threaded portion; a side electrode attached to the lower end of said body member and extending inwardly toward the central opening in said insulator; a hollow central electrode disposed within said insulator and extending therethrough to a point adjacent said side electrode; a transparent rod disposed within said central electrode; an elongated cylindrical member attached to the upper end of said body member; a jacket member attached to said cylindrical member near the upper and lower ends of said cylindrical member and spaced apart therefrom so as to form an annular space therebetween; conduit means attached to said jacket member for circulating a heat exchange medium through said annular space; an insulating member disposed within said cylindrical member, said insulating member having a central longitudinal opening extending therethrough, the upper portion of said opening being smaller in cross sectional area than intermediate and lower portions of said opening which latter portions have progressively larger cross sectional areas, the lower and largest portion having a diameter large enough to allow the lower end of said insulating member to pass over said insulator and rest upon said body member and said insulating member having a second longitudinal opening extending therethrough offset from said central opening; a substantially cylindrical bushing member disposed within said intermediate portion of said central opening of said insulating member; a tubular contact member attached to the upper end of said central electrode and extending upwardly within said bushing member, the upper end of said tubular member having an expanded cross sectional area so as to contact the inner walls of said bushing member; an electrical lead connected to said bushing member and extending upwardly through said offset opening in said insulating member and outwardly through the upper portion of said cylindrical member; a container with its long axis horizontally disposed above said cylindrical member, one of the ends of said container being open; a second jacket member surrounding the closed end portion of said container and spaced apart therefrom so as to form an annular space therebetween, said jacket member being attached to the upper end of said cylindrical member; a tubular member extending through said container and said second jacket member and positioned above and in axial alignment with said central opening of said insulating member; conduit means attached to said second jacket member for circulating a heat exchange medium through said annular space; a photoelectric cell positioned within said container; and an electrical plug fitted into the open end of said container, said plug providing means for supporting said cell and for connecting a pair of electrical leads to the terminals of said cell.

References Cited in the file of this patent

FOREIGN PATENTS

| 263,883 | Great Britain | Aug. 11, 1927 |
| 831,166 | Germany | Feb. 11, 1952 |

OTHER REFERENCES

Technique Note, No. 27, R. Vichnievsky (Recherches Areonautiques), 1946, Paris, pp. 74–77.

National Bureau of Standards Technical News Bulletin vol. 37, No. 8, August 1953, pp. 113–115.